Patented Aug. 10, 1943

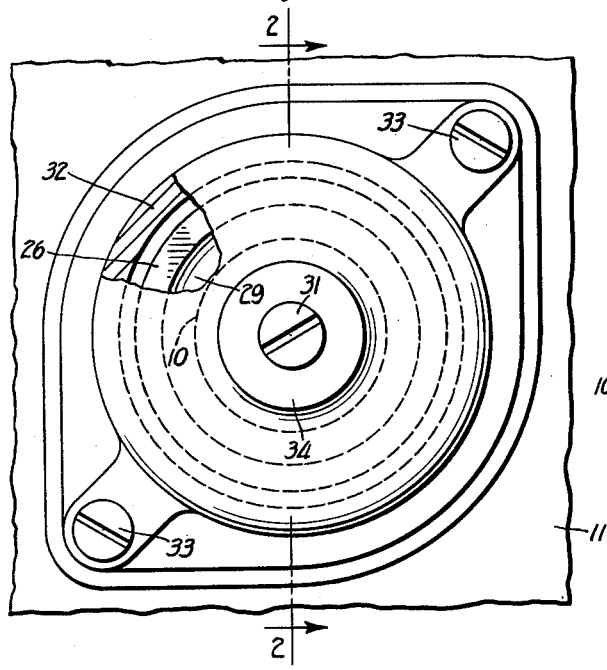
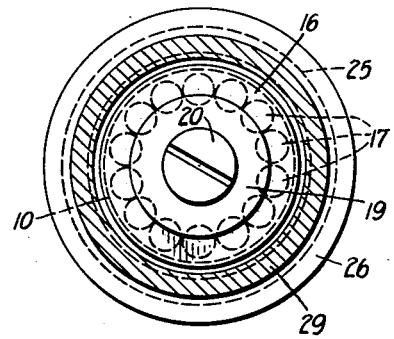
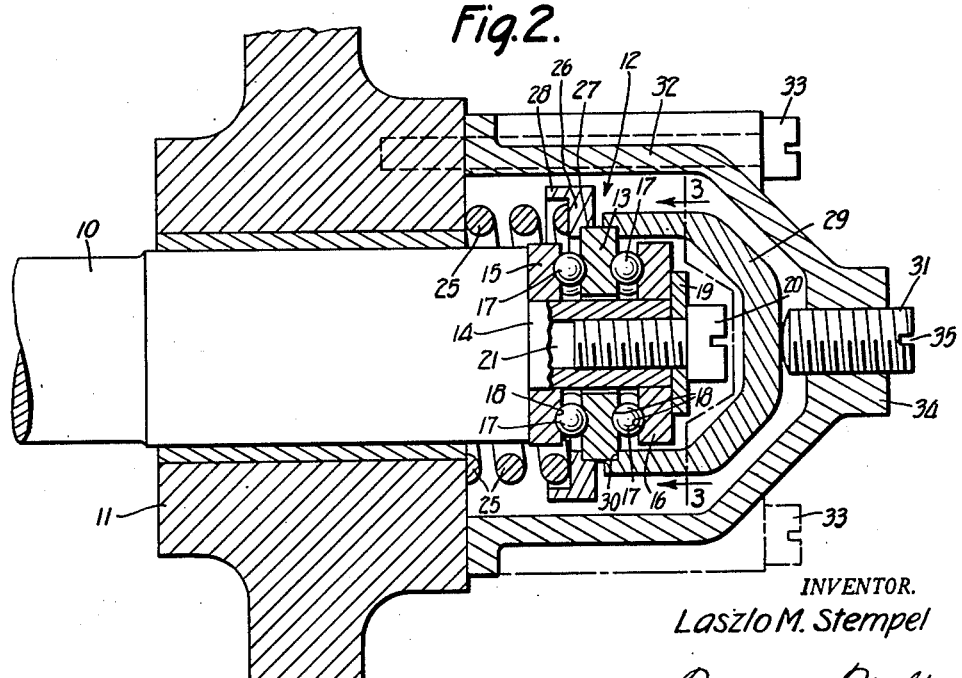

2,326,180

UNITED STATES PATENT OFFICE 2,326,180

ADJUSTABLE THRUST BEARING

Laszlo M. Stempel, Coraopolis, Pa., assignor to The Lithograph Press Manufacturing Company, Pittsburgh, Pa., a corporation of Pennsylvania Application March 14, 1942, Serial No. 434,691

10 Claims. (Cl. 308—233)

This invention relates to thrust bearings and is especially directed to a construction adapted for mounting at or near the end of a shaft which will facilitate accurate and convenient lengthwise adjustment of the shaft without interrupting its rotation. Bearings of this type are desirable for instance in rotary printing presses for obtaining accurate transverse registry, and especially for correcting improper registry without stopping the press. The invention is however applicable to many other types of machines, such as lens grinding machines, in which accurate axial adjustment without stopping the machine is advantageous.

The general purpose of the invention is to provide a novel adjustable bearing construction that is simple, strong and easy to operate. Another object is the provision of an improved bearing construction suitable for adjusting the shaft endwise in either direction and which can be located entirely at one end of the shaft. A further object is to provide an axial adjusting construction for shafts that is suitable for use with thrust ball bearings of standard types.

Other objects and advantages will appear from the following description considered in conjunction with the accompanying drawing in which Fig. 1 is an end elevational view of the bearing construction with parts broken away;

Fig. 2 is a longitudinal section on line 2—2 of Fig. 1; and

Fig. 3 is a partial transverse section on line 3—3 of Fig. 2.

The invention is illustrated in its application to a shaft 10 rotatably mounted in a machine frame member 11 and engaging a thrust bearing 12 provided with a nonrotating race 13 and associated races and balls arranged to resist thrust in either axial direction. In the particular arrangement illustrated, the thrust ball bearing 12 is mounted on stud 14 extending from and preferably integral with the end of shaft 10, and includes an inner race 15 and an outer race 16 rotating with stud 14, with interposed balls 17 running in the usual registering annular tracks 18 in races 13, 15 and 16, the assembly being held in place by a washer 19 engaged by screw 20 threaded into bore 21 in stud 14.

A suitable spring is arranged to exert axial pressure on race 13, tending to shift the bearing 12 and shaft 10 axially. This is conveniently accomplished by providing a coil spring 25 surrounding the end of shaft 10, and bearing outwardly against non-rotating race 13. While this may be accomplished by direct engagement, it is advantageous to utilize a pressure ring 26 engaged by spring 25, the other end of the spring bearing against a suitable abutment, such as the side of frame member 11. Ring 26 is provided with an annular notch 27 fitting the adjacent outer edge of race 13, and includes means such as inwardly directed flange 28 for retaining the spring 25 against radial movement away from substantially concentric position.

The adjusting construction includes means engaging the fixed race 13 arranged to shift race 13 inwardly against pressure of spring 25, or to permit said race to move outwardly under spring pressure to a desired extent for axial adjustment of the shaft 10. This is advantageously accomplished by employing a member threaded through a support and bearing against race 13 directly or through a connecting member or members. In the form illustrated a thrust cap 29 extends around and is spaced from the outer end of bearing 12 and is provided with an annular groove 30 fitting the adjacent outer edge of race 13, either throughout its periphery or at appropriate circumferentially balanced points thereon. An adjusting screw 31 bears against cap 29 in axial alignment with bearing 12 and shaft 10 and is threaded through a suitable support fixed to the frame member 11. This support may conveniently constitute a housing 32 for the thrust bearing 12, mounted on frame member 11 by suitable screws 33, said housing having an axial boss 34 through which adjusting screw 31 is threaded. While screw 31 as shown is provided with the usual screwdriver notch 35, it will be understood that the construction is suitable for mounting a handle or other operating element on screw 31.

Spring 25 is sufficiently strong to shift the shaft 10 outwardly when screw 31 is eased off; and by providing a suitable pitch to the threads of screw 31, the latter can be turned inwardly against the pressure of spring 25 without difficulty and at a rate which will provide a highly accurate lengthwise adjustment of shaft 10 without interfering with the continuous rotation of the shaft. The disclosed construction is extremely simple and is readily assembled or disassembled. To disassemble the entire structure it is necessary only to remove the housing 32 and take out screw 20. The invention is suitable for application to various types of thrust bearing, since the non-rotating element of any type of thrust bearing may be connected with spring 25 and adjusting screw 31 by intermediate elements suitably designed to fit the bearing.

I have described what I believe to be the best embodiments of my invention. I do not wish, however, to be confined to the embodiments shown, but what I desire to cover by Letters Patent is set forth in the appended claims.

I claim:

1. An adjusting thrust bearing construction comprising a rotatable shaft, a thrust ball bearing including spaced rotating races mounted on the shaft and an intermediate non-rotating race, an abutment, a spring engaging the abutment and bearing against the non-rotating race arranged to bias the non-rotating race and shaft in an axial direction, a support, and adjusting means engaging the non-rotating race and support arranged to shift the non-rotating race and shaft axially against the pressure of the spring.

2. An adjusting thrust bearing construction as set forth in claim 1 including a shaft bearing member carrying the abutment, and in which the spring is a coil spring coaxial with the shaft.

3. An adjustable thrust bearing construction as set forth in claim 1 in which the adjusting means comprises an adjusting member threaded through the support.

4. An adjusting thrust bearing construction as set forth in claim 1 in which the adjusting means comprises an adjusting member threaded through the support, and a connecting member engaging the adjusting member and the non-rotating race.

5. An adjusting thrust bearing construction as set forth in claim 1 including a pressure transmitting member interposed between the spring and the non-rotating race.

6. An adjusting thrust bearing construction comprising a rotatable shaft, a radial shaft bearing support member, a thrust ball bearing including a pair of rotating races mounted on the shaft and an intermediate non-rotating race, a spiral spring surrounding the shaft engaging the bearing support member and bearing against the non-rotating race arranged to bias the race and shaft in an axial direction, an adjustable frame member mounted on the bearing support member and extending across the end of the shaft, and a shaft adjusting construction carried by the frame member and engaging the non-rotating race.

7. An adjusting thrust bearing construction as set forth in claim 6 in which the frame member comprises a housing surrounding the end of the shaft and the thrust ball bearing.

8. An adjusting thrust bearing construction as set forth in claim 6 in which the adjusting construction comprises a thrust member engaging the non-rotating race and extending across the end of the shaft, and an adjusting element coaxial with the shaft threaded through the frame member and engaging the thrust member.

9. An adjustable thrust bearing construction comprising a rotatable shaft, a thrust ball bearing mounted on the end of the shaft comprising spaced rotating races fixed to the shaft and an intermediate non-rotating race, a radial bearing support member adjacent the shaft end, a coil spring surrounding the shaft and bearing against the bearing member and the non-rotating race arranged to bias the shaft axially, a frame member extending across the end of the shaft and mounted on the bearing support member, and a shaft adjusting construction including a thrust member engaging the non-rotating race and an adjusting element threaded through the frame member.

10. An adjustable thrust bearing construction as set forth in claim 9 in which the races are axially removable from the shaft and are held in place by a detachable retaining member.

LASZLO M. STEMPEL.